US 6,681,163 B2

(12) United States Patent
Stam et al.

(10) Patent No.: US 6,681,163 B2
(45) Date of Patent: Jan. 20, 2004

(54) MOISTURE SENSOR AND WINDSHIELD FOG DETECTOR (75) Inventors: Joseph S. Stam, Holland, MI (US); Harold C. Ockerse, Holland, MI (US); Charles David Kibler, IV, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 99 days.

(21) Appl. No.: 09/970,728

(22) Filed: Oct. 4, 2001

(65) Prior Publication Data
US 2003/0069674 A1 Apr. 10, 2003

(51) Int. Cl.[7] .................................................. B60S 1/08
(52) U.S. Cl. ................. 701/36; 250/208.1; 250/227.25; 318/444
(58) Field of Search .................... 701/1, 36; 750/208.1, 750/227.25, 339, 341.7; 318/DIG. 2, 444, 483; 340/602

(56) References Cited

U.S. PATENT DOCUMENTS

| 4,355,271 A | 10/1982 | Noack |
| 4,620,141 A | 10/1986 | McCumber et al. |
| 4,652,745 A | 3/1987 | Zanardelli |
| 4,798,956 A | 1/1989 | Hochstein |
| 4,859,867 A | 8/1989 | Larson et al. |
| 4,867,561 A | 9/1989 | Fujii et al. |
| 4,871,917 A | 10/1989 | O'Farrell et al. |
| 4,916,307 A | 4/1990 | Nishibe et al. |
| 4,916,374 A | 4/1990 | Schierbeek et al. |
| 4,930,742 A | 6/1990 | Schofield et al. |
| 4,956,591 A | 9/1990 | Schierbeek et al. |
| 4,960,996 A | 10/1990 | Hochstein |
| 4,973,844 A | 11/1990 | O'Farrell et al. |
| 4,987,354 A | 1/1991 | Steinmann |
| 5,276,389 A | 1/1994 | Levers |
| 5,306,992 A | 4/1994 | Dröge |
| 5,313,072 A | 5/1994 | Vachss |
| 5,336,980 A | 8/1994 | Levers |
| 5,386,111 A | 1/1995 | Zimmerman |
| 5,483,346 A | 1/1996 | Butzer |
| 5,498,866 A | 3/1996 | Bendicks et al. |
| 5,581,240 A | 12/1996 | Egger |
| 5,598,146 A | 1/1997 | Schröder |
| 5,659,294 A | 8/1997 | Schröder |

(List continued on next page.)

FOREIGN PATENT DOCUMENTS

| DE | 2946561 | 5/1981 |
| DE | 4424454 | 1/1996 |
| DE | 19803694 | 1/1998 |
| EP | 0479169 | 4/1992 |
| EP | 0832798 | 9/1997 |
| GB | 2056059 | 3/1981 |
| JP | 9-126998 | 5/1997 |
| WO | 9427262 | 11/1994 |
| WO | 9501561 | 1/1995 |
| WO | 9923828 | 5/1999 |
| WO | 9947396 | 9/1999 |
| WO | 0053465 | 9/2000 |
| WO | 0177763 | 10/2001 |

Primary Examiner—Richard M. Camby
(74) Attorney, Agent, or Firm—Price, Heneveld, Cooper, DeWitt & Litton (57) ABSTRACT The system of the present invention is configured to detect moisture on a surface and includes a sensor that may be divided into a plurality of subwindows. At least one of the subwindows has a sensitivity that is independently variable. The system may further include an optical system operative to direct light rays from at least a portion of the surface onto the sensor, and a processing system in communication with the sensor and operative to independently adjust the sensitivity of the at least one subwindow and to analyze data from the sensor to detect moisture. The processing system may control the windshield wipers based upon a number of subwindows in which moisture is detected.

14 Claims, 7 Drawing Sheets

U.S. PATENT DOCUMENTS

| | | |
|---|---|---|
| 5,661,303 A | 8/1997 | Teder |
| 5,663,542 A | 9/1997 | Kohr et al. |
| 5,703,568 A | 12/1997 | Hegyi |
| RE35,762 E | 4/1998 | Zimmerman |
| 5,796,094 A | 8/1998 | Schofield et al. |
| 5,796,106 A | 8/1998 | Noack |
| 5,811,793 A | 9/1998 | Pientka |
| 5,818,600 A | 10/1998 | Bendicks et al. |
| 5,821,863 A | 10/1998 | Schröder et al. |
| 5,872,437 A | 2/1999 | Pientka et al. |
| 5,923,027 A | 7/1999 | Stam et al. |
| 6,008,486 A | 12/1999 | Stam et al. |
| 6,097,024 A | 8/2000 | Stam et al. |
| 6,118,383 A | 9/2000 | Hegyi |
| 6,207,967 B1 | 3/2001 | Hochstein |
| 6,313,454 B1 | 11/2001 | Bos et al. |
| 6,320,176 B1 | 11/2001 | Schofield et al. |
| 6,323,477 B1 | 11/2001 | Blasing et al. |

MOISTURE SENSOR AND WINDSHIELD FOG DETECTOR

CROSS-REFERENCE TO RELATED APPLICATIONS

This application is related to U.S. patent application Ser. No. 09/878,799 entitled "MOISTURE SENSOR AND WINDSHIELD FOG DETECTOR," filed on Jun. 12, 2001, now U.S. Pat. No. 6,495,815, which is a continuation of U.S. patent application Ser. No. 09/592,896 filed Jun. 13, 2000, entitled "MOISTURE SENSOR AND WINDSHIELD FOG DETECTOR," now U.S. Pat. No. 6,262,410, which is a continuation of U.S. patent application Ser. No. 09/347,093, filed on Jul. 2, 1999, entitled "MOISTURE SENSOR AND WINDSHIELD FOG DETECTOR," now U.S. Pat. No. 6,097,024, which is a continuation of U.S. patent application Ser. No. 08/931,118, filed on Sep. 16, 1997, entitled "MOISTURE SENSOR AND WINDSHIELD FOG DETECTOR," now U.S. Pat. No. 5,923,027, the entire disclosures of which are incorporated herein by reference.

BACKGROUND OF THE INVENTION

The present invention relates to a system for automatically detecting the presence of moisture on a surface, such as the surface of a windshield of a vehicle for an automobile, in order to automatically actuate the vehicle's windshield wipers and/or defroster or defogging system.

In conventional windshield wiper systems, the windshield wipers are actuated based on the elapsed time between wipes rather than the moisture level on the exterior of the windshield. During conditions of relatively consistent rainfall, for example, the time interval can be adjusted to correspond to the amount of time in which the rain accumulates to the point of the desired visibility level. Unfortunately, the rate of rainfall may vary dramatically over a given period of time. Additionally, traffic conditions may also cause varying amounts of rain to fall on the windshields, such as when a truck passes by. As a result, during such conditions, the driver must frequently adjust the wiper time interval, which can be cumbersome.

Various systems are known which automatically control the interval between wipes of the windshield wipers based upon moisture on the vehicle windshield. In some known systems, various coatings are applied to the vehicle windshield. Electrical measurement of those coatings is used to provide an indication of the moisture content on the windshield. Unfortunately, such methods require relatively expensive processes, which makes such systems commercially non-viable. Other systems for automatically sensing the moisture content on a vehicle windshield are also known. For example, optical systems are known which measure the difference of reflected light of a dry windshield versus a wet windshield. Unfortunately, such optical systems are susceptible to interference from external light sources and thus provide inadequate performance. Other known systems must be adhered to the windshield, which complicates the windshield replacement. As a result of such complications, moisture sensors are rarely found on vehicles.

Another system for automatically detecting the moisture content on a windshield is disclosed in Japanese Laid Open Patent Application No. Hei(1995)-286130, which describes the use of a charge coupled device (CCD) image sensor to image a portion of the vehicle windshield in order to detect raindrops. The system described therein computes the sum of the differences between each pixel and the average of all pixels. Unfortunately, headlamps of oncoming vehicles will create a bright spot in the image, which would be difficult to completely blur and likely be interpreted as rain. Moreover, in order for such a system to work effectively, distant objects within the imaged scene must be completely blurred. Otherwise, there will be dark and light regions in the imaged scene corresponding to the distant objects. Although there is no optical system disclosed in the Japanese laid open patent application for accomplishing this objective, it would be very difficult to develop an optical system to completely blur an oncoming headlamp. Failure to blur oncoming headlamps could cause false triggering of the system disclosed in the above-identified Japanese laid open patent application.

Another problem with automatic rain detection systems is the inability of the system to detect the operation of the windshield wipers. In certain cold climate conditions, the windshield wipers are known to freeze to the windshield. In such a situation, since the moisture is not being removed by the wipers, an automatic rain sensing device would continuously command the wipers to actuate, even though the wipers are frozen to the windshield, potentially damaging the windshield wiper system.

Another problem with known systems is the inability to detect fog on the interior and exterior of the windshields. As mentioned above, automatic moisture detection systems, such as disclosed in the above-identified Japanese laid open patent application, are based upon the ability to detect raindrops on the windshield. When a uniform fog or mist covers the vehicle windshield, systems, such as the system disclosed in the Japanese laid open patent application, are unable to sense such moisture on the exterior of the windshield. As a result, during such a condition, the windshield wipers will have to be manually actuated, thereby partially defeating the purpose of an automatic rain sensor and windshield wiper control system making the feature a lot less desirable.

In other situations, fog develops on the inside of the windshield independent of the moisture content on the exterior of the windshield. In such a condition, automatic rain sensing systems, such as disclosed in the Japanese laid open patent application, are unable to detect the moisture content on the exterior of the vehicle windshield until after the fog on the interior of the windshield is cleared. In such a condition, a defroster or defogger system would have to be manually actuated to remove the interior fog on the windshield. The automatic rain sensor would not be operable during such a condition until the fog on the interior of the windshield is sufficiently cleared.

In commonly assigned U.S. Pat. Nos. 5,923,027, 6,097,024, and 6,262,410, a moisture sensing system is disclosed that overcomes the problems noted above. Nevertheless, it would be desirable to further improve the ability of the disclosed system to distinguish from light sources within the imaged scene that may cause false triggering of the windshield wipers.

SUMMARY OF THE INVENTION

According to one embodiment of the present invention, a moisture sensing system is provided that comprises: a sensor that is divided into a plurality of subwindows each having a sensitivity that is variable independent of the other subwindows; an optical system operative to direct light rays from at least a portion of the surface onto the sensor; and a processing system in communication with the sensor and operative to adjust the sensitivity of the subwindows and to analyze data from the sensor to detect moisture on the surface.

According to another embodiment of the invention, a system is provided for detecting moisture on a surface that comprises: a sensor that is divided into a plurality of subwindows, at least one of the subwindows having a sensitivity that is independently variable; an optical system operative to direct light rays from at least a portion of the surface onto the sensor; and a processing system in communication with the sensor and operative independently to adjust the sensitivity of the at least one subwindow and to analyze data from the sensor to detect moisture on the surface.

According to another embodiment of the present invention, a windshield wiper control system for a vehicle is provided that comprises: a sensor that is divided into a plurality of subwindows; an optical system operative to direct light rays from at least a portion of the surface of the windshield onto the sensor; and a processing system in communication with the sensor and operative to analyze data from the sensor to determine whether moisture is detected in each subwindow and to control the windshield wipers based upon a number of subwindows in which moisture is detected.

According to another embodiment of the present invention, a windshield wiper control system for a vehicle is provided that comprises: a sensor; an optical system operative to direct light rays from at least a portion of the surface of the windshield onto the sensor; and a processing system in communication with the sensor and operative to analyze data from the sensor to detect moisture on the windshield and to automatically activate the windshield wipers when moisture is detected. The processing system is responsive to at least one remote device to enable or disable automatic control of the windshield wipers.

According to another embodiment of the present invention, a system for detecting moisture on a surface is provided that comprises: an image sensor array including a plurality of light sensors; an optical system operative to image at least a portion of the surface onto the image sensor array; a supplemental illuminator for selectively illuminating the portion of the surface imaged onto the image sensor array; memory for storing a first image obtained by the image sensor array when the supplemental illuminator is illuminating the portion of the surface, and for storing a second image obtained by the image sensor array when the supplemental illuminator is not illuminating the portion of the surface; and a processing system in communication with the memory, the supplemental illuminator, and the image sensor array. The processing system is operative to compare the first and second images stored in the memory and to analyze results of the comparison to detect moisture on the surface.

According to another embodiment of the present invention, a fog detector system is provided for detecting fog on an inside surface of a vehicle window. The fog detector system comprises: an emitter for selectively projecting radiation onto a region of the inside surface of the vehicle window; a sensor disposed with its optical axis substantially in parallel with that of the emitter, the sensor being sensitive to the radiation projected by the emitter for sensing levels of incident radiation both when the emitter projects radiation and when the emitter does not project radiation; and a control circuit coupled to the emitter for selectively activating the emitter, and coupled to the sensor for receiving signals from the sensor representing the level of incident radiation. The control circuit determines the difference between levels of incident radiation when the emitter is activated and when the emitter is deactivated, and compares the difference to a threshold to determine whether fog is present. When fog is present, the control circuit generates a signal indicating the presence of fog on the vehicle window.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

A moisture sensing system in accordance with the present invention is able to detect moisture on a surface such as the windshield of a vehicle. Such a system is useful for automatically controlling the vehicle's windshield wipers, defroster, and/or defogging systems. The system for sensing moisture on a vehicle windshield eliminates many of the performance deficiencies of known moisture sensing systems and provides a moisture sensing system at a commercially viable cost. As used herein, the term "moisture" is used to designate various types of moisture and precipitation which can be found on the windshield of a vehicle during various climatic conditions, such as rainfall, snowfall, ice, and fog, as well as other substances that are commonly deposited on a vehicle windshield such as bugs, dust, and the like. The system is able to provide superior performance to other known systems during rather common climatic conditions, such as ice, fog, and varying levels of rain, snowfall, and the like.

Figure 1:
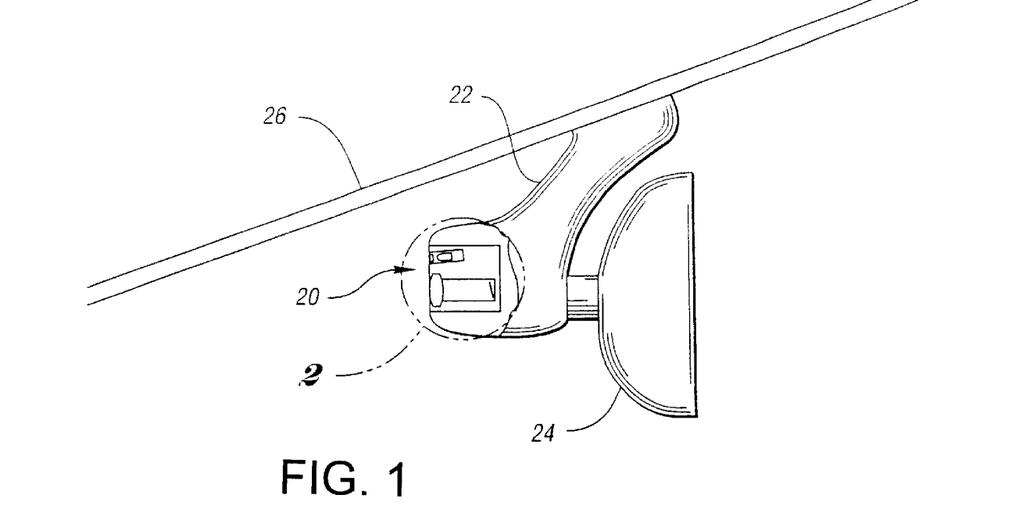
FIG. 1 is a side elevational view showing a rearview mirror assembly incorporating a moisture sensing system constructed in accordance with the present invention.

Referring to FIG. 1, the moisture sensing system of a first embodiment of the present invention is generally identified with the reference numeral 20. The moisture sensing system is preferably mounted stationary in the mounting bracket 22 of an automobile rearview mirror 24 or alternatively mounted in the rear portion of the rearview mirror housing 24. Further still, the moisture sensing system may be mounted elsewhere in the vehicle. For example, the moisture sensing system could be mounted in a headliner, an overhead console, A-pillar, instrument panel dash, a windshield-mounted console, or in any other vehicle accessory. The moisture sensing system 20 includes an imaging system 30 including a sensor array 32 mounted, for example, 55–105 mm behind the vehicle windshield 26 with the optical axis substantially parallel to ground or slightly angled to the ground. The angle of the windshield 26 in a modern passenger car varies considerably from model to model. An example of the angle of a car windshield is about 27°. The windshield angle of trucks may be much different. Such a configuration may cause the raindrops and other moisture to be at a different distance from the image sensor array 32 depending on where the moisture is with respect to the field of view of the image sensor array 32. To help compensate for this problem, the image sensor array 32 may be angled toward the windshield 26 such that the top of the image sensor 32 is moved closer to the windshield 26. For example, with a windshield angle of about 27°, image sensor 32 may be angled approximately 12–17° toward the windshield 26.

There are four components to the inventive moisture sensing system 20 of the first embodiment: an imaging optical system; one or more light emitting diodes; an image sensor array; and a processing system. The imaging optical system is shown in FIGS. 2, 3, 5, and 6, while the image sensor array is illustrated in FIGS. 2, 5, 7, and 8.

The imaging optical system is used to image a predetermined portion of the windshield 26 onto the sensor array 32 such that objects at the approximate distance of the windshield 26 are more sharply in focus at the image plane while objects at a longer distance are more out of focus and blurred. The area of the windshield 26 that is imaged should be large enough that the probability of receiving raindrops during relatively light rain conditions is significant. Moreover, the imaged area of the windshield should also be in the area of the windshield that is wiped by the windshield wipers.

Figure 2:
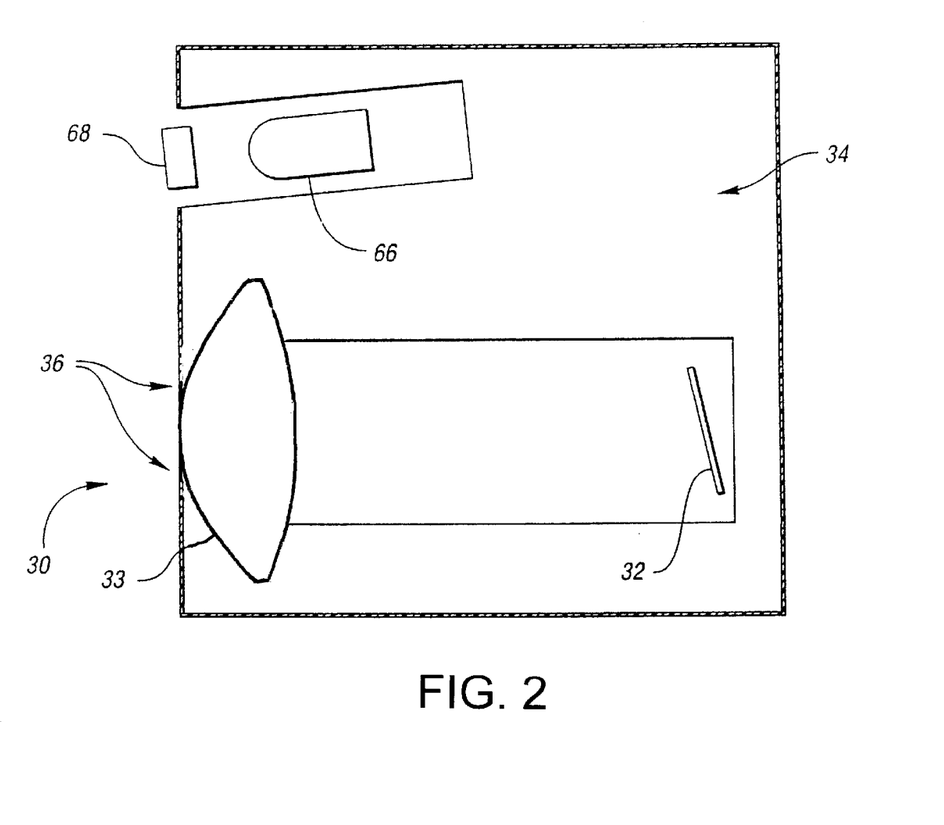
FIG. 2 is an enlarged view showing the moisture sensing system constructed in accordance with the present invention.
Figure 3:
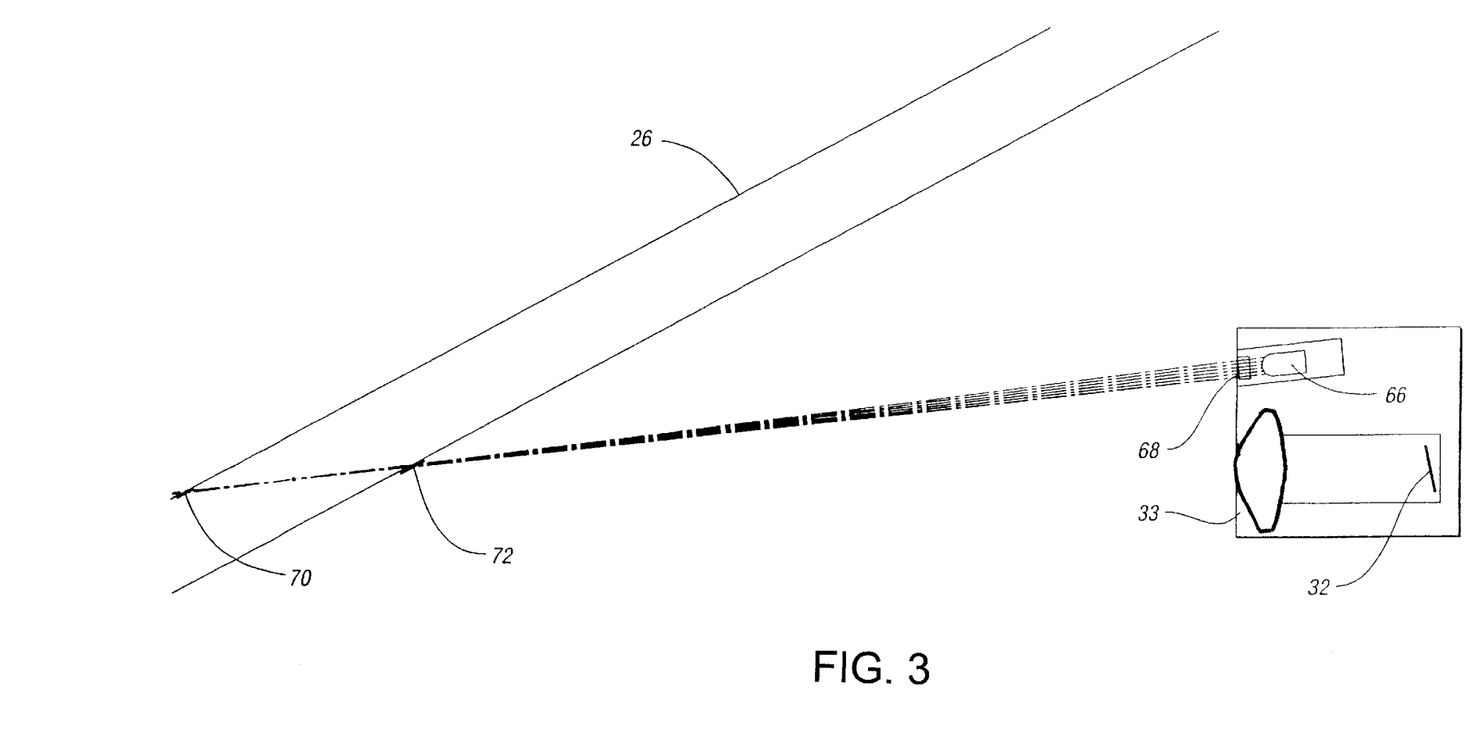
FIG. 3 is a side elevational view showing the moisture sensing system in proximity to a vehicle windshield.
Figure 4A:
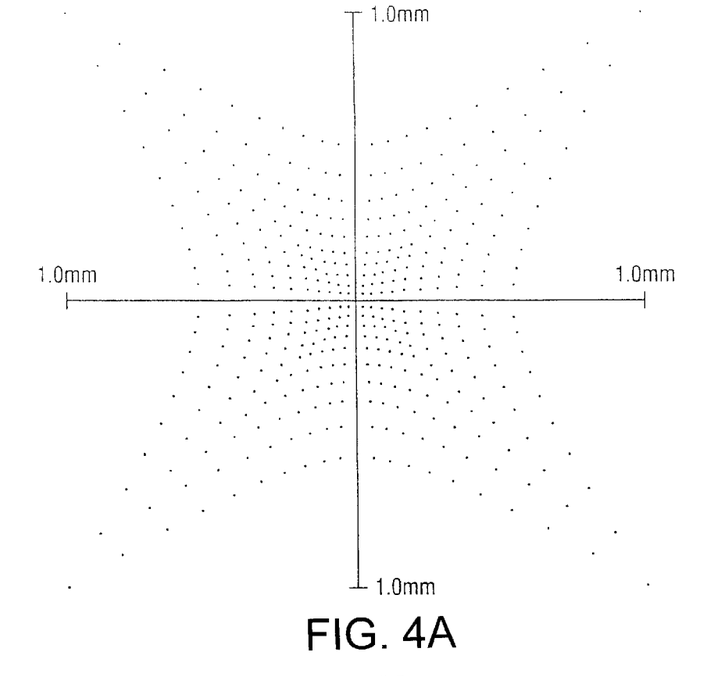
FIGS. 4A and 4B are computer simulated spot diagrams, which illustrate the performance of the optical system in accordance with the present invention during moisture and non-moisture conditions, respectively.
Figure 4B:
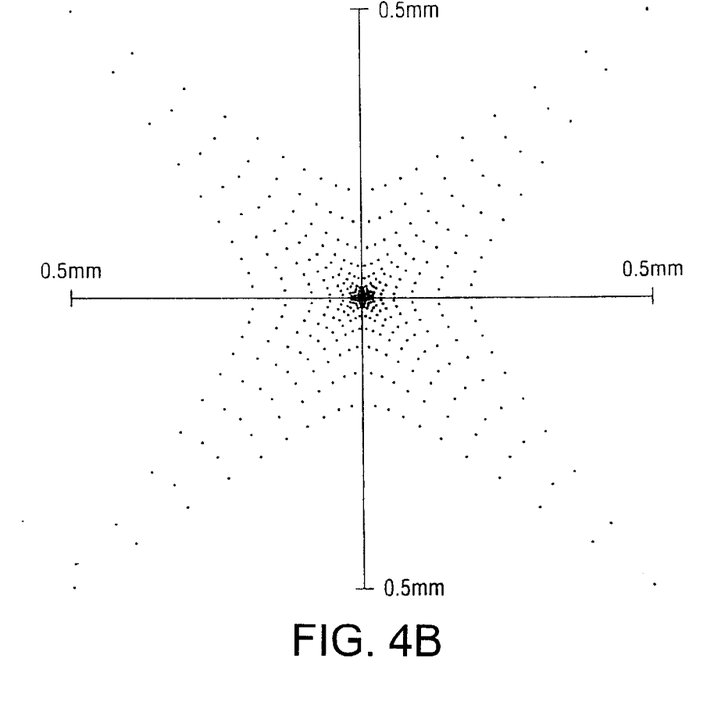

FIGS. 4A and 4B illustrate a computer simulation of the performance of the imaging system illustrated in FIG. 2. In particular, FIG. 4A is a spot diagram of the imaging of approximately parallel light rays from a relatively distant object on the optical axis onto an image plane. FIG. 4B is a spot diagram of the imaging of a point on the optical axis at the distance of the outer surface of the windshield. Upon comparison of the spot diagrams of FIGS. 4A and 4B, it is evident that the optical system is able to blur light coming from distant objects while focusing light from objects at the windshield distance.

Figure 5:
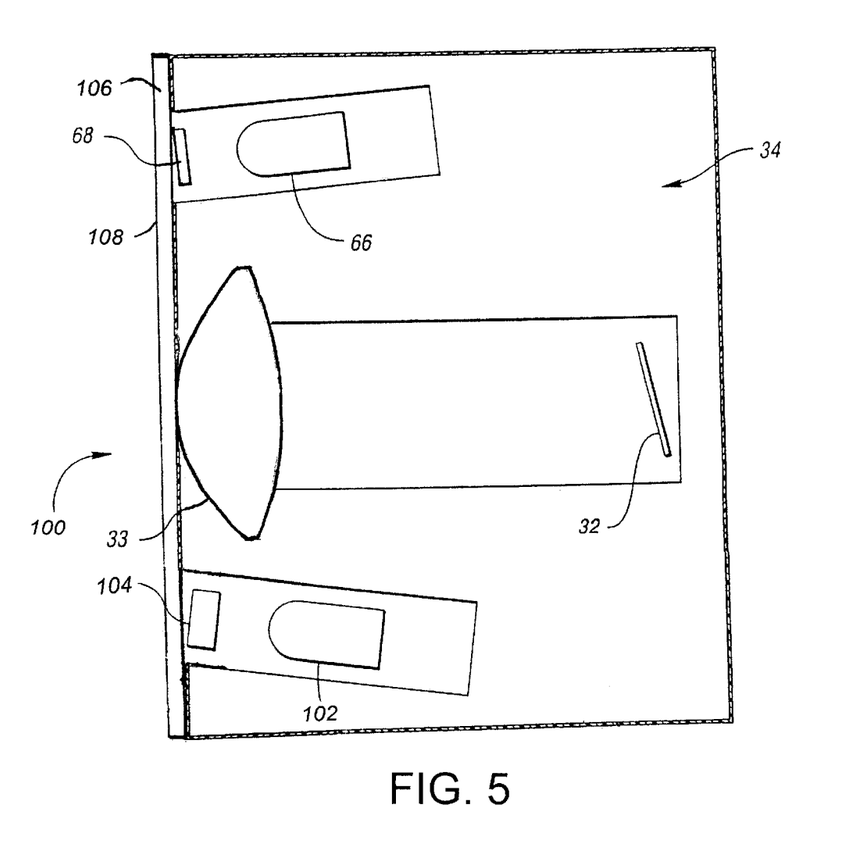
FIG. 5 is an enlarged view showing a moisture sensing system constructed in accordance with a second embodiment of the present invention.
Figure 6:
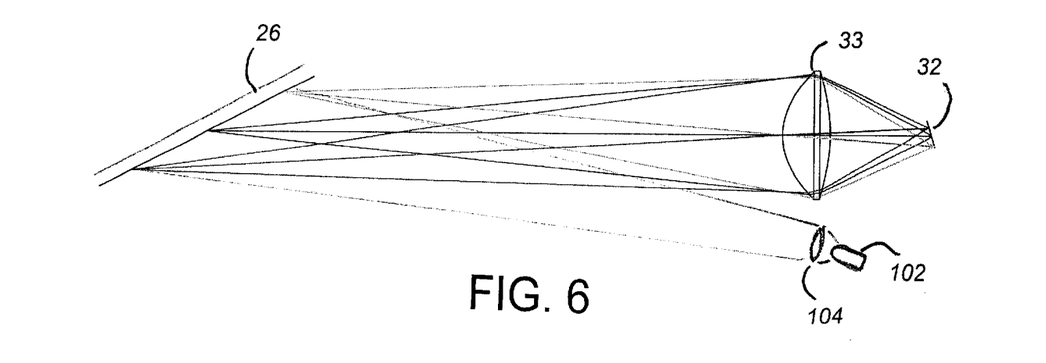
FIG. 6 is a side elevational view of a portion of the moisture sensing system of the second embodiment shown relative to a vehicle windshield.

The imaging optical system preferably includes a single aspheric lens 33 (see FIGS. 2, 5, and 6). The lens may be carried by a mechanical lens mount 34, which forms a stop 36 about a 5 mm diameter directly in front of the lenses. According to a preferred embodiment, lens 33 has a diameter of 9 mm, an edge thickness of 0.04009 mm, and a thickness along the central optical axis of 3.295987 mm. The lens is preferably made of acrylic, which has a refractive index $n_D$ of 1.49167 and an Abbe number $v_D$ of 55.31019. The object side surface has an effective radius of curvature of 7.377602 mm, a conic of –0.8590915 mm, and a second order term of 0.0390. The image side of lens 33 has an effective radius of curvature of –5.039234 mm, a conic of –1.500052 mm, and a second order term of 0.0556585. It will be appreciated, however, that one or more lenses having different constructions may likewise be used and that the invention is not limited to the specific lens described above.

The image sensor array 32 is located behind the lens 33 and is slightly angled by about 12–17°. It will be appreciated, however, that the angle at which image sensor array 32 is disposed is dependent upon the angle of the windshield, and thus the angle of the image sensor array 32 may vary. Preferably, image sensor array 32 is angled relative to windshield 26 such that the Scheimpflug condition is satisfied. The Scheimpflug condition is discussed in "Modem Optical Engineering," by Warren J. Smith (page 52). Basically, the Scheimpflug condition suggests that when the image plane is not parallel to the object plane, the optimal focus is obtained when the object and image planes intersect each other at the plane of the lens. Thus, by extending the plane of the lens upward to determine where it intersects the windshield plane, the angle of the image sensor array 32 may be determined by extending its plane from the point of intersection.

More elaborate optical systems, for example, with additional elements, aspherical elements, or defractive objects, could all be used especially if a shorter distance from the windshield is a desired feature. However, since the collected images are not for photographic purposes, such optical quality is not necessary in an application for moisture detection.

The image sensor array 32 is preferably a CMOS active pixel image sensor. CMOS active pixel image sensors provide low cost, high sensitivity imaging on a chip manufactured in a CMOS process. Such CMOS active pixel image sensors have several advantages over other sensors including low power consumption, popular CMOS production techniques, low cost, ability to integrate additional circuitry on the same chip, variable read out windows, and a variable light integration time. Such CMOS active pixel image sensors are commercially available from Photobit Inc., Pasadena, Calif., including, for example, Photobit part No. PB-0111. Suitable systems are described in detail in commonly assigned U.S. Pat. No. 5,990,469, entitled "CONTROL CIRCUIT FOR IMAGE ARRAY SENSORS," by Jon H. Bechtel et al., and commonly assigned U.S. Pat. No. 6,008,486, entitled "WIDE DYNAMIC RANGE OPTICAL SENSOR," by Joseph S. Stam et al., the entire disclosures of which are incorporated herein by reference. The ability to obtain images from separate subwindows of the CMOS image sensor make it particularly suitable for the present invention in which the image sensor array 32 is divided into "subwindows."

While CMOS active pixel image sensors have substantial advantages, other image sensors are also suitable and are considered to be within the scope of the present invention. The size and number of pixels is determined to image an area of the windshield sufficiently large and in enough detail to adequately detect light rain while remaining cost effective. A 64×80 active pixel array may be utilized or alternatively, a one-dimensional sensor array may be utilized. According to a more preferred example, a Photobit PB-0111 Common Intermediate Format (CIF) Imager is used that has a 352×288 active pixel array with pixel spacing of 7.8 μm.

FIG. 5 shows an enlarged view of a moisture sensing system 100 constructed in accordance with a second embodiment of the present invention. Moisture sensor system 100 generally includes all the elements of system 20 of the first embodiment, but additionally includes a supplemental illuminator 102, which may be an LED or other light source, an optional supplemental illuminator lens 104, and a window 106 disposed in front of lenses 33, 68, and 104. Window 106 may include a photocatalytic/hydrophilic coating 108 on an exterior surface thereof to maintain a clear and clean surface, even in the presence of moisture droplets or other contaminants that may form on the outer surface of window 106. Such contaminants may include cleaners, grease, or the like. Examples of suitable photocatalytic/ hydrophilic coatings are disclosed in commonly assigned U.S. Pat. No. 6,193,378, the entire of disclosure of which is incorporated herein by reference.

As shown in FIG. 6, supplemental illuminator 102 and supplemental illuminator lens 104 are configured so as to project light over the same portion of windshield 26 that is imaged by lens 33 and image sensor array 32. Supplemental illuminator 102 differs in this respect from illuminator 66, which projects a small spot on the windshield for fog detection. Supplemental illuminator 102 may be periodically activated such that images are obtained with and without supplemental illumination. Such images may then be compared and analyzed to detect moisture on the surface of the windshield. In relatively dark conditions, some image sensors may not be capable of collecting enough light in a reasonable time to adequately image moisture such as raindrops. In such a situation, supplemental illuminator 102 may briefly illuminate the area of interest from behind while the images are being taken. If the windshield of the vehicle is not highly absorbent to infrared radiation, supplemental illuminator 102 may be a near infrared illuminator as long as the wavelengths are within the detectable region of the image sensor. An infrared illuminator has the benefit of not being visible to the human eye and thus not distracting to the driver.

Window 106 may also include an infrared cut filter having a narrow bandwidth around approximately 850 nm for passing infrared radiation corresponding to that emitted from supplemental illuminator 102 while blocking most other light. The filter could also be a narrow band blue filter, but would preferably be infrared. The filter could be provided directly on or proximate the image sensor die.

Figure 7:
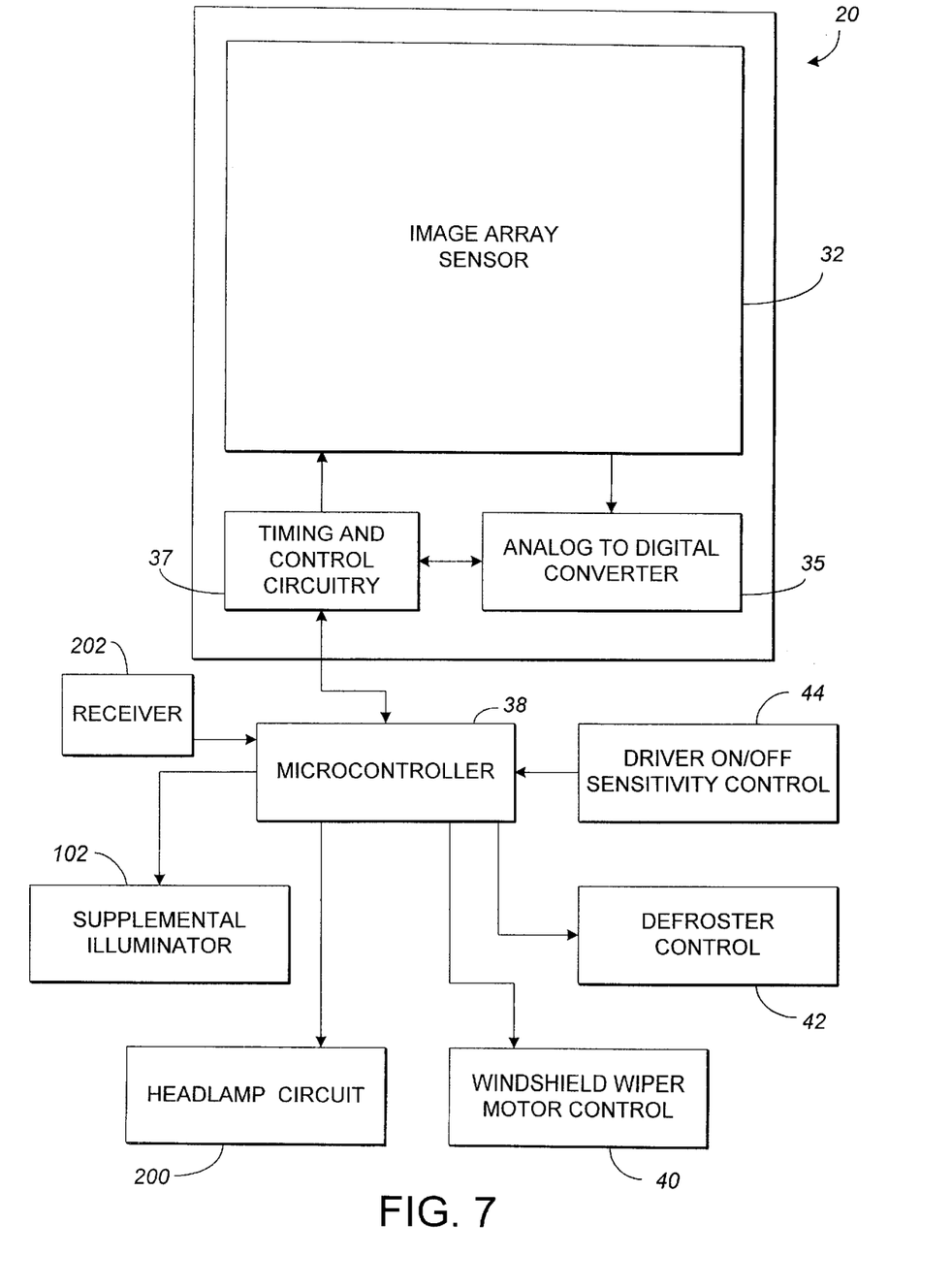
FIG. 7 is a block diagram of the moisture sensing system constructed in accordance with the present invention.

A block diagram of the moisture sensing circuitry is shown in FIG. 7. As mentioned above, a predetermined portion of the windshield 26 is imaged onto the image sensor array 32. The image sensor array is controlled by a processing system/circuit that also reads and processes the data obtained from sensor array 32. The processing system includes an analog-to-digital converter 35, a timing and control circuit 37, and a microcontroller 38. The analog voltage of each of the pixels within the sensor 32 is converted to digitized grayscale value by way of the analog-to-digital converter 35. The analog-to-digital converter 35 is operated under the control of the timing and control circuit 37, which, in turn, is controlled by the microcontroller 38. The timing and control circuit 37 is described in detail in commonly assigned U.S. Pat. No. 5,990,469, entitled "CONTROL CIRCUIT FOR IMAGE ARRAY SENSORS," by Jon H. Bechtel et al., the entire disclosure of which is incorporated herein by reference. In a preferred embodiment, the processing system independently controls the exposure of various subwindows of the image sensor array 32 in the manner described further below.

A suitable microcontroller 38 is a Motorola STAR 12™, part No. MCS912D64. In the event that the microcontroller does not contain sufficient random access memory (RAM) to store an entire image from the image sensor, the windowing feature of the CMOS imaging sensors may be used to alternatively image and process different regions of a small enough size for the onboard RAM of the microcontroller 38. Alternatively, the in-line processing procedure disclosed in commonly assigned U.S. patent application Ser. No. 09/799, 310, entitled "IMAGE PROCESSING SYSTEM TO CONTROL VEHICLE HEADLAMPS AND OTHER VEHICLE EQUIPMENT," filed on Mar. 5, 2001, by Joseph S. Stam et al. may be used to reduce the memory requirements of the processor. The entire disclosure of the '310 application is incorporated herein by reference.

Once an image is acquired by the image sensor 32, the luminance of each pixel, represented by an analog voltage, is converted to a digital grayscale value by the analog-to-digital converter 35. These values are written to memory, which may be on board the microcontroller 38 and processed by the microcontroller 38 or alternatively a digital signal processor.

To further enhance the accuracy of the system and to enable the system to distinguish between raindrops and windshield cracks or debris on the windshield, the processing system 38 preferably utilizes edge detection techniques and may analyze the spatial high frequency components of the image(s). More specifically, raindrops are detected by quantifying the discontinuity resulting from sharp edges of the raindrops on the windshield. These sharp edges are caused by the focused images of the rain or other moisture droplet along with the random optical imaging of far-field objects by the droplets or other moisture. Laplacian, Sobel, or preferably Prewitt filtering may be employed for detecting the edges in the images.

Figure 8:
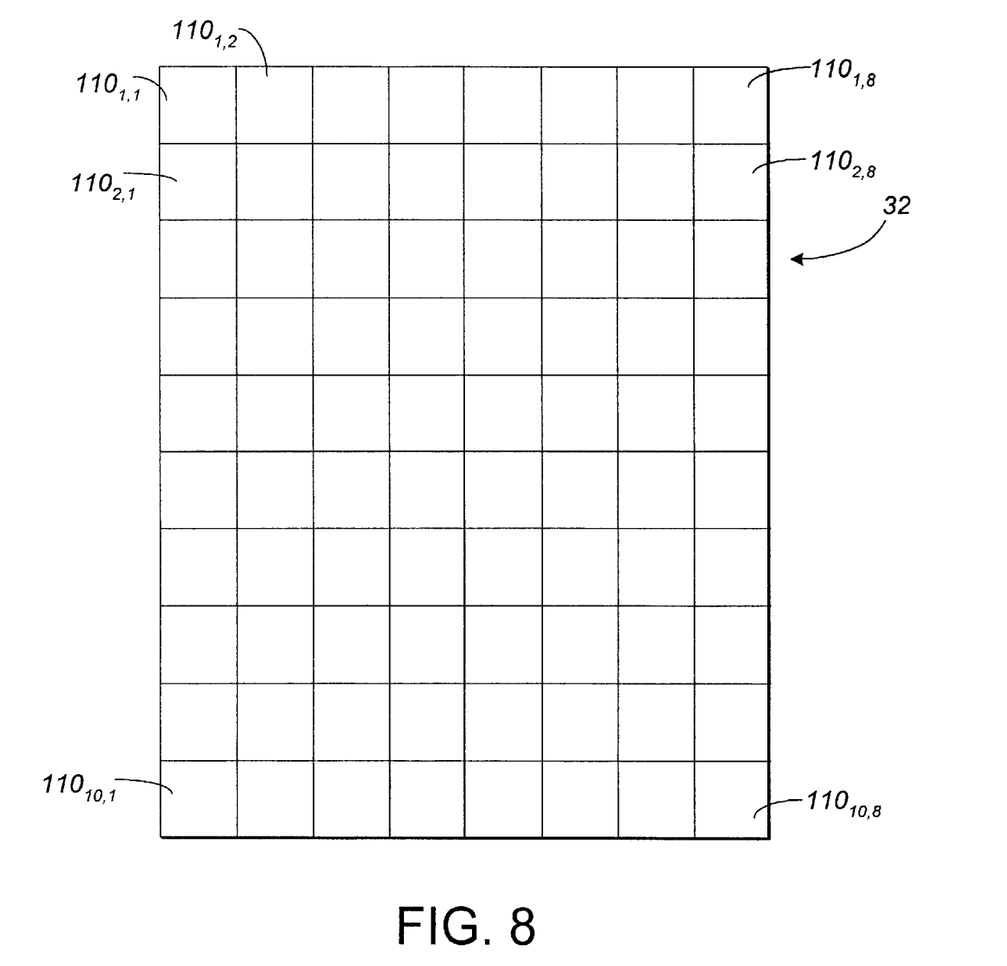
FIG. 8 is a block diagram illustrating an image sensor array divided into various subwindows.

As shown in FIG. 8, image sensor array 32 may effectively be divided into a plurality of subwindows 110. In the case of an image sensor array 32 having sixty-four columns of pixels and eighty rows of pixels, a suitable subwindow 110 may be formed of an 8×8 block of the pixels forming image array sensor 32. In this manner, image sensor array 32 may be effectively divided into an array of 8×10 subwindows. As used herein, a subwindow may include a block of contiguous pixels, a single line of pixels, alternating lines of pixels, or various other combinations of pixels corresponding to a subset of all the pixels of the array.

The processing system analyzes the images from each of the plurality of subwindows 110 (FIG. 8) of the image sensor array 32 for sharp discontinuities caused by the edges of the water rain droplets or other moisture and by random focusing of the distant objects by the droplets. These discontinuities represent high spatial frequency components. The spatial distribution of the detected edges may be used to distinguish moisture on the windshield from other objects such as bugs, debris, or headlamps of oncoming vehicles or tail lights of preceding vehicles because rain is typically much more evenly distributed across the imaged portion of the windshield. An indicator of the spatial distribution of the detected edges is the number of subwindows 110 in which edges are detected. The greater the number of subwindows in which edges are detected, the greater the spatial distribution of the detected edges and hence the objects that are on the windshield. Moreover, the greater the spatial distribution of the objects, the greater the magnitude of moisture and hence the faster the windshield wipers should be operated. The magnitude of the spatial high frequency components and the number of subwindows 110 in which edges are detected are used to control a windshield wiper motor control 40 (FIG. 7) such that the frequency of wiping of the windshield wiper blades (i.e., time interval between wipes) is controlled as a function of the amount of moisture on the windshield. Alternatively, the wipers may be activated each time a threshold level of moisture on the window (i.e., number of subwindows in which edges are detected) is reached.

The system is also able to adapt to varying light levels. In particular, during selected cycles, the average grayscale value of the image may be computed. If this value is high, indicating an overexposure to light, the exposure time of the image sensor may be reduced to lower the average brightness. Similarly, if the light level is low, the exposure time may be increased. The specific manner in which the exposure time of the image sensor is adjusted is discussed further below.

When the image obtained by image sensor array 32 is divided into subwindows 110, the sensitivity/exposure time of each of the subwindows 110 may be independently adjusted. Alternatively, the exposure/sensitivity level of the image sensor array 32 may be varied as a whole. When varying the sensitivity of the image sensor array as a whole, the average grayscale value of the pixels may be computed and the sensitivity adjusted (as described further below) to maintain the average grayscale value within predefined limits. However, when adjusting the sensitivity of the image sensor array 32 as a whole, far-field light sources, such as those from an oncoming vehicle, may cause large intrascene illumination variations. If these large variations are not taken into account, parts of the image may be overexposed or underexposed, which reduces the detectable contrast caused by rain on the windshield. It is therefore preferable to adjust the sensitivity of the subwindows independent of one another based upon the average grayscale value output from the pixels of the subwindow. Thus, if bright headlights from an oncoming vehicle produce large bright spots in only two of the eighty subwindows of the image sensor array 32, the exposure/sensitivity of those subwindows may be reduced relative to that of the remaining subwindows without also reducing the sensitivity of the remaining subwindows and thereby maintaining the sensitivity and contrast within those other subwindows.

By independently controlling the sensitivity of subwindows within image sensor array 32, the system may be configured to adjust the sensitivity of those subwindows imaging the portion of the image above the horizon relative to those subwindows imaging a portion of the image below the horizon. This may be quite significant during those periods during which the sky is relatively bright compared to the road and other surroundings.

Regardless of whether exposure is adjusted on a per subwindow basis, the basic automatic gain control (AGC) algorithm, which may be performed by microcontroller 38, is the same. First, in order to reduce computational requirements, the AGC algorithm preferably uses integer arithmetic only. The algorithm works by first calculating the pixel average of either the entire image sensor array or the subwindow under consideration. If this average is already within a specified band (the image is already properly exposed), then the next exposure for the subwindow/image sensor array is left unchanged. Otherwise, the algorithm continues by comparing the pixel average target with the current pixel average. If the target is larger than the current average, then the exposure for the subwindow or whole image sensor array will be adjusted higher. Likewise, if the pixel average target is smaller then the current image window pixel average, the exposure is adjusted lower. In both cases, the difference between the current pixel average and the target is calculated. This difference is then adjusted depending on the current exposure value and added or subtracted as appropriate to the current exposure in order to create the new exposure value. This difference value adjustment may be performed by logic left or right shifts, which effectively multiply or divide the exposure value by increasing powers of two. The reason this may be preferable is that the imager results are much more sensitive to small absolute changes in exposure when the current exposure value is small. The AGC algorithm makes similar adjustments on a percentage basis across the large exposure value range without using floating-point arithmetic. Minimum and maximum exposure value constants may be used to clip all exposure values generated by the AGC algorithm. This limits the exposure range to avoid noise problems at very small exposures and timing problems (in sufficient frame rate) at very large exposures.

In addition to the AGC algorithm discussed above, the exposure level of the array or of subwindows or individual pixels may also be adjusted by varying the analog-to-digital conversion parameters of ADC 35, or adjusting the analog gain of the sensor outputs.

As noted above, it is preferable to make use of the "distributed" property of rain to help identify rain images. When it is raining, in general the raindrops tend to be spread somewhat evenly across the entire image. Far-field lights, however, tend to show up in a more localized manner. To detect bright lights in the subwindows, the average pixel variation is determined. The average pixel variation is defined as the average absolute difference between the pixel value and the pixel grayscale average across the entire subwindow. The bright far-field lights cause extremely high contrast in the imaged subwindows, which also results in a high pixel variation in the subwindow. Normally exposed raindrops cause lower pixel variations. Thus, each subwindow may be tested against a maximum pixel variation threshold to determine if the subwindow should be considered for further rain processing. If the average pixel variation for a subwindow exceeds the maximum pixel variation threshold, microcontroller 38 may exclude the subwindow from the subwindow count upon which microcontroller 38 determines if rain is present.

Although the preferred embodiment has been disclosed as utilizing eighty subwindows of 8×8 pixels each, it will be appreciated by those skilled in the art that any number of subwindows may be utilized of any resolution. In general, the greater the number of subwindows, the greater the ability of the system to block out and ignore bright far-field objects or faulty pixels. However, arbitrarily increasing the number of subwindows will decrease the resolution within each subwindow due to the limited number of pixels in the entire array. If the number of pixels within a subwindow is too small, then the average value computed for the subwindow will vary more significantly and be more likely to produce inconsistent results across the entire image sensor array. Also, it will become more likely that an edge lies between subwindows that could go undetected.

An example of an image sensor suitable for use in the present invention is disclosed in commonly assigned U.S. Pat. No. 6,008,486, entitled "WIDE DYNAMIC RANGE OPTICAL SENSOR," by Joseph S. Stam et al., the entire disclosure of which is incorporated herein by reference.

By taking advantage of the inherent memory in the sensor circuits, correlated double samples may be obtained directly from the image sensor to subtract out the ambient light and thus reduce the memory requirements of the processor or associated external memory. Another method for preserving memory in the event that the above-noted correlated double sampling inherent in the sensor circuit is not utilized, is for microcontroller 38 to read the image data one row at a time, first with illumination and then without illumination utilizing a one-dimensional filter to subtract out the image data of the row with and without illumination from one another. The result may then be stored in the RAM associated with the microcontroller 38 prior to reading the next row with and without illumination.

The system described above may also be used to detect the passing of the wiper blades past the imaged area of the windshield. If the wipers of the automobile are designed in such a way that the wipers are never approximately vertical when it crosses the imaged area, the filters described above can be modified to accommodate such a configuration. For example, various other edge detection methods well known in the art of image processing can also be used. Additionally, if the wiper speed for the vehicle windshield wipers is so fast that it blurs slightly in the image for the necessary exposure time, the horizontal filter can be modified to subtract the pixels two positions to the left and right of the current pixel instead of the pixels immediately next to the current pixel.

After the wiper has cleared the imaged area, additional images of the windshield are acquired. These images may be used as a zero point measurement that may be subtracted from all subsequent measurements until the next wipe. In this way, long-term high frequency spatial components in the image of dirty windshield, cracks, scratches, and frozen ice will not contribute to the detected amount of rain.

If the windshield wiper is not detected within a given time frame, the system assumes that a malfunction has occurred, which can be caused as a result of the windshield wiper being frozen to the windshield. During such a condition, the operation of the moisture sensor in accordance with the present invention can be suspended for a period of time to allow the ice to thaw. If outside temperature information is available, freezing climate conditions can be taken into account to decide if the wipers are failing because of a mechanical malfunction or due to ice.

In order to provide selectivity of a system, a driver on/off sensitivity control circuit 44 (FIG. 7) may be provided. The intermittent wiper control may be used to allow adjustment of the system's sensitivity. This control circuit 44 may be used in special circumstances, for example, when the vehicle is in an automatic car wash to prevent spurious operation of the system. Because some drivers will often engage their windshield wipers while driving through an automatic car wash, which increases the possibility that the wipers will be damaged by being bent or torn from the vehicle, it would be desirable to configure the wiper control system to be responsive to a signal from a remote device so as to at least temporarily disable the wipers from operation during such time that the vehicle is traveling through the car wash. This may be accomplished by providing a transmitter that transmits a relatively low strength IR or RF signal at the entrance to the automatic car wash within the frequency band of most remote keyless entry receivers (202) that are now commonly provided in vehicles. The signal may be modulated with a standard code that is then transmitted over the vehicle bus or otherwise transmitted directly to microcontroller 38, which recognizes this signal and responds by generating a signal to disable the vehicle's windshield wipers either for a predetermined time period following receipt of this disable signal or until such time that a subsequent signal is received at the exit of the car wash at which point the microcontroller 38 may toggle a wiper disable flag to permit the operation of the wipers under control of the moisture sensing system of the present invention or under manual control. This is particularly advantageous when the driver enters the automatic car wash with the wiper control in the automatic mode, since the moisture sensing system would detect moisture when the vehicle has entered the car wash and then otherwise attempt to activate the windshield wipers thereby risking their destruction.

Other mechanisms by which operation of the automatic wiper system could be disabled are disclosed in commonly assigned U.S. patent application Ser. No. 09/827,304 entitled "VEHICLE REARVIEW MIRROR ASSEMBLY INCORPORATING COMMUNICATION SYSTEM," by Robert R. Turnbull et al., on Apr. 5, 2001, the entire disclosure of which is incorporated herein by reference. For example, microcontroller 38 could be coupled to a microwave receiver that receives signals from a plurality of satellites such as GPS satellites. The microcontroller 38 may then disable or enable automatic activation of the windshield wipers in response to information obtained from the microwave receiver. Such information may, for example, indicate that the microwave receiver is receiving signals from less than a predetermined number of GPS satellites thereby indicating that the vehicle has entered an enclosed area, such as a car wash or parking garage. Alternatively, GPS information, upon which microcontroller 38 may otherwise deactivate or activate the automatic windshield wipers, may include vehicle location data that may be compared to a database of known locations of automatic car washes.

The system of the present invention may also include a mechanism for detecting fog on the inside or outside surface of the windshield. Such a mechanism is disclosed in U.S. Pat. No. 5,923,027, the entire disclosure of which is incorporated herein by reference. To implement such a fog detecting mechanism with the moisture sensing system of the present invention, an illuminator 66, such as an LED, would be added in addition to supplemental illuminator 102. Unlike illuminator 102, which illuminates the entire imaged area of the windshield, the additional illuminator 66 would be configured to project a focussed spot of light onto the windshield that is then sensed using one or both of the image sensor arrays.

Figure 9:
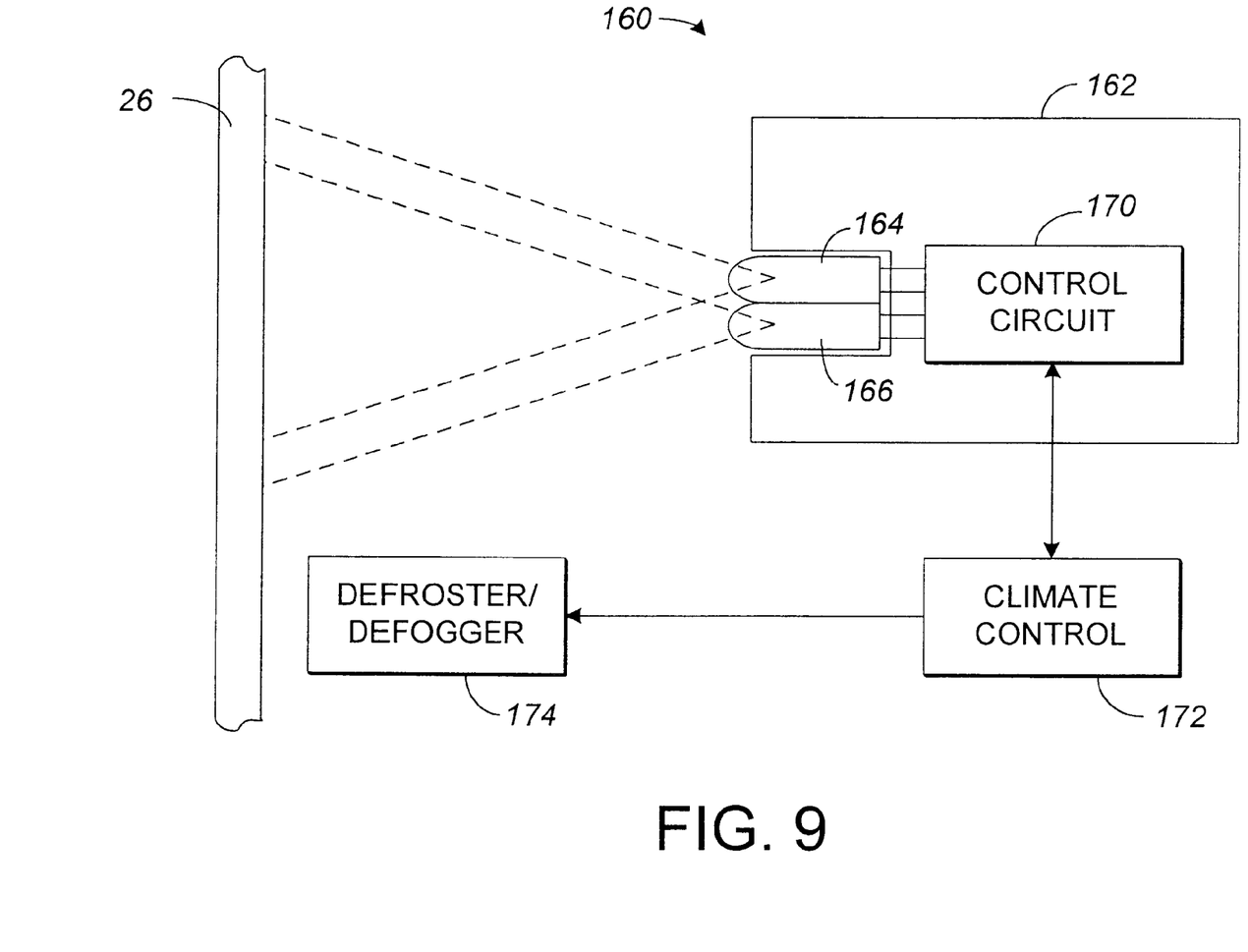
FIG. 9 is a partial perspective view and electrical circuit diagram in block form illustrating a fog detecting system constructed in accordance with another embodiment of the present invention.

According to another embodiment of the present invention, a fog detector 160 is provided for detecting the presence of fog on either the inside or outside of a window 26. Window 26 may be any of the windows in a vehicle or may be a window other than in a vehicle. Fog detector 160 includes an emitter 164 and a sensor 166 disposed with their optical axes generally in parallel. Emitter 164 and sensor 166 are preferably mounted in very close proximity, if not in contact with one another, within a housing 162. The optical axis of the emitter is preferably oriented with respect to the window such that the light emitted therefrom does not impinge the window at an angle causing the light to enter and be internally reflected within the window as are some forms of prior art moisture sensors. Housing 162 may be the housing of a rearview mirror assembly when window 26 is the front windshield of the vehicle or may be a housing on the mount of the rearview mirror assembly. Alternatively, housing 162 may be incorporated into a center high-mounted stoplight (CHMSL) assembly or any other vehicle accessory adjacent a vehicle window. Examples of such vehicle accessories or mounting locations include the rear dash, the instrument panel dash, the headliner, an overhead console, a window-mounted console, A-, B-, or C-pillars, etc.

Emitter 164 may be virtually any light source and is preferably an LED. Emitter 164 preferably emits infrared radiation so as to not project a visible spot on the window. The optics of the emitter is preferably such that the light it emits is divergent rather than focussed to a spot.

Sensor 166 may be any form of sensor that is sensitive to the radiation emitted from emitter 164. The field of view of sensor 166 is preferably essentially equivalent to the angle of emission of emitter 164 on window 26. Sensor 166 may be a CdS sensor or a CMOS photodiode of the type disclosed in U.S. Pat. No. 6,359,274. If the fog detector 160 is implemented in a rearview mirror assembly and the rearview mirror assembly incorporates an electrochromic mirror, sensor 166 may also function as a forward ambient light sensor whose output is utilized in determining the reflectance level of the electrochromic mirror.

Fog detector 160 further includes a control circuit 170, which may be analog, or include a microcontroller. Control circuit 170 may or may not be housed within the same housing 162 as emitter 164 and sensor 166. Control circuit 170 is communicatively coupled to the climate control 172 of the vehicle, which in turn is coupled to the defogger/defroster 174. Defogger/defroster 174 may be type that blows air onto the interior surface of window 26 or may be the type used on a rear window and having one or more electric heating elements for heating the interior surface of the rear window 26.

In general, control circuit 170 selectively and periodically activates emitter 164 while sensing the output of sensor 166 both when emitter 164 is activated and when it is not activated. Control circuit 170 may be calibrated during such time that window 26 is clear to determine the light level difference sensed by sensor 166 when emitter 164 is activated and when it is not activated. This calibrated difference may then be utilized to establish a threshold difference for comparison of the sensed differences later obtained during use. When there is a fog on the inside or outside of window 26, the light is diffused and reflected back towards sensor 166 thereby creating a much greater difference in light levels sensed by sensor 166 when emitter 164 is activated and deactivated. When this difference reaches a threshold level, control circuit 170 may generate a signal to the climate control system 172 to cause the defroster 174 to be activated. Control circuit 170 may be connected by a discrete line to climate control 172 or it may communicate therewith either over the vehicle bus or via a wireless link. By sensing the light level without emitter 164 activated, control circuit 170 may determine the relative ambient light level and adjust the levels otherwise sensed when emitter 164 is activated for the detected ambient light level.

While fog detector 160 is preferably calibrated during vehicle manufacture, it may subsequently automatically calibrate at such times that the vehicle windshield is clear. Such subsequent automatic calibration may be desirable in view of the fact that the windshield may otherwise be dirty or include a film as is often caused by smoking cigarettes within the vehicle. Control circuit 170 may utilize climate information from climate control 172 or from other sources to determine when window 26 would otherwise be clear of fog. Clearly, it would be desirable to avoid activating defogger/defroster 174 when the window is merely dirty and such activation of defogger/defroster 174 will not assist in clearing window 26. Information that control circuit 170 may utilize in determining whether the windshield should otherwise be clear may include sensed conditions such as provided from interior and exterior temperature sensors and humidity sensors that may otherwise be used in the vehicle. For example, a comparison of the interior and exterior temperatures will typically indicate whether it is even possible for there to be fog on the vehicle windshield. Additionally, control circuit may determine whether fog is possible by monitoring the output of sensor 166 over time following activation of the defroster 174. For example, as detected fog the windshield decreases over time, the output of the sensor 166 approaches a constant level representing a baseline for that windshield. This baseline may not necessarily represent a perfectly clear windshield, since the windshield may be coated with a layer of dirt or soot from smoking in the vehicle. The baseline can then stored for use in subsequent comparisons for automatically activating the defroster 174.

By minimizing the spacing between the optical axes of emitter 164 and sensor 166, the field of view of the sensor will more likely correspond to the projected spot of emitter 164 and the system may be positioned relatively close, i.e., within six inches or less, of the interior surface of window 26. This would allow the fog detector 160 to be incorporated in many different forms of vehicle accessories that are provided in proximity to the vehicle window. To minimize spacing of emitter 164 and sensor 166, both may be encapsulated in a common encapsulant.

Unlike other fog detecting systems previously known, the fog detector 160 shown in FIG. 9 may be implemented at a relatively low cost thereby making it practical to incorporate the inventive fog detecting system in a CHMSL assembly or other vehicle accessory in proximity to the rear windshield of the vehicle for the function of controlling the rear defroster. Most rear defrosters generally are manually activated and remain active only for a predetermined period of time regardless of whether the rear window is already cleared. By utilizing the fog detector of the present invention, the rear window or any other window may be maintained in a clear state without over-utilizing the climate control system.

As shown in FIG. 7, the microcontroller 38 may also be coupled to a vehicle headlamp circuit 200 for controlling the state of the vehicle headlamps. Microcontroller 38 may control the state of the vehicle headlamps, i.e., on/off mode (low-beam, high-beam, daytime running lamps, brightness, aim, etc.), in response to images detected utilizing either image sensor array 32 or an additional image sensor array that is otherwise coupled to microcontroller 38. Similarly, an additional microcontroller 38 could be provided to read the information from image sensor array 32 for the purpose of controlling vehicle headlamp circuit 200. By combining components of the inventive moisture sensor system with a headlamp control circuit, duplication of parts may be minimized thereby allowing the implementation of both features in a vehicle at a relatively low cost. Examples of such headlamp dimming systems are disclosed in commonly-assigned U.S. Pat. Nos. 5,837,994, 6,049,171, 6,255,639, and 6,281,632, the entire disclosures of which are incorporated herein by reference.

Also, by combining the system shown in FIG. 9 or the functional aspects thereof with any vehicle-mounted system employing a camera (i.e., systems for headlamp dimming, adaptive cruise control, collision avoidance, lane departure detection, rear vision, night vision, etc.), one may determine whether the system's camera view is blocked or the window in front of the camera is merely fogged over. The system shown in FIG. 9 is sufficiently small to allow it to be incorporated within such a camera behind any window it may have within its housing in order to determine whether the camera's view is impaired. A second such system may then be employed to detect whether the vehicle window through which the camera captures images is foggy. Control of the camera and related systems may then be adjusted or deactivated in response to such information.

Occasionally when driving up a hill, the vehicle could be positioned in such a way that the sun is directly imaged by the device. The radiative loading caused by this alignment may damage the image sensor 32 over time. In order to alleviate such a problem, an electrochromic filter may be used to temporarily eliminate most of the sunlight from the image plane. Other optical electronic or optical mechanical devices could also be used. It may be desirable that such a dynamic filter have a darkened state when power is removed such that the filter may function as an effective shutter that is closed when the camera is not in use. By using such a dynamic filter having a darkened state when no power applied, the filter effectively blocks most light from reaching the camera even when the vehicle is turned off without drawing power and draining the vehicle battery. Examples of such filters include electrochromic filters employing tungsten oxide, some LCD devices, and suspended particle devices.

Although the present invention has been described as utilizing a two-dimensional array of sensors to capture a single image of a portion of the windshield, one or more one dimensional sensor arrays or more than one two-dimensional sensor arrays may be utilized as disclosed in commonly assigned U.S. patent application Ser. No. 09/970, 962, entitled "MOISTURE SENSOR UTILIZING STEREO IMAGING WITH AN IMAGE SENSOR," filed concurrently herewith by Harold C. Ockerse et al., the entire disclosure of which is incorporated herein by reference.

While the invention has been described in detail herein in accordance with certain preferred embodiments thereof, many modifications and changes therein may be effected by those skilled in the art without materially departing from the novel teachings and advantages of this invention. Accordingly, all such modifications are intended to be included within the scope of this invention as defined in the following claims and, therefore, it is our intent to be limited only by the scope of the appending claims and not by way of the details and instrumentalities describing the embodiments shown herein.

The invention claimed is:

1. A system for detecting moisture on a surface comprising:
   a sensor that is divided into a plurality of subwindows each having a sensitivity that is variable independent of the other subwindows;
   an optical system operative to direct light rays from at least a portion of the surface onto said sensor; and
   a processing system in communication with said sensor and operative to adjust the sensitivity of the subwindows and to analyze data from said sensor to detect moisture on the surface.

2. The system of claim 1, wherein said processing system adjusts the sensitivity of the subwindows by adjusting an integration period during which said sensor accumulates charge in response to light incident of said sensor.

3. The system of claim 1, wherein said processing system adjusts the sensitivity of a subwindow by determining an average grayscale value for pixels forming the subwindow, comparing the average grayscale value with a target average value, and adjusting the exposure time of the subwindow as a result of the comparison.

4. The system of claim 1, wherein said processing system controls the windshield wipers based upon a number of subwindows in which moisture is detected.

5. The system of claim 1 and further comprising:
   a supplemental illuminator for selectively illuminating the portion of the surface imaged onto the sensor; and
   memory for storing a first set of data obtained by said sensor when the supplemental illuminator is illuminating the portion of the surface, and for storing a second set of data obtained by said sensor when the supplemental illuminator is not illuminating the portion of the surface,
   wherein said processing system is in communication with said memory, said supplemental illuminator, and said sensor and operative to compare the first and second sets of data stored in said memory and to analyze results of the comparison to detect moisture on the surface.

6. A system for detecting moisture on a surface comprising:
   a sensor that is divided into a plurality of subwindows, at least one of said subwindows having a sensitivity that is independently variable;
   an optical system operative to direct light rays from at least a portion of the surface onto said sensor;
   a processing system in communication with said sensor and operative to independently adjust the sensitivity of said at least one subwindow and to analyze data from said sensor to detect moisture on the surface;
   a supplemental illuminator for selectively illuminating the portion of the surface imaged onto said sensor; and
   memory for storing a first set of data obtained by said sensor when the supplemental illuminator is illuminating the portion of the surface, and for storing a second set of data obtained by said sensor when the supplemental illuminator is not illuminating the portion of the surface,
   wherein said processing system is in communication with said memory, said supplemental illuminator, and said sensor and operative to compare the first and second sets of data stored in said memory and to analyze results of the comparison to detect moisture on the surface.

7. A windshield wiper control system for a vehicle comprising:
   a sensor;
   an optical system operative to direct light rays from at least a portion of the surface of the windshield onto said sensor; and
   a processing system in communication with said sensor and operative to analyze data from said sensor to detect moisture on the windshield and to automatically activate the windshield wipers when moisture is detected, wherein said processing system is responsive to at least one remote device to enable or disable automatic control of the windshield wipers, wherein said processing system is coupled to an RF receiver and the at least one remote device is an RF transmitter, such that said processing system enables or disables automatic activation of the windshield wipers when a predetermined signal is received by the RF receiver from the RF transmitter.

8. The windshield wiper control system of claim 7, wherein the RF receiver is a remote keyless entry receiver.

9. A windshield wiper control system for a vehicle comprising:
   a sensor;
   an optical system operative to direct light rays from at least a portion of the surface of the windshield onto said sensor; and
   a processing system in communication with said sensor and operative to analyze data from said sensor to detect moisture on the windshield and to automatically activate the windshield wipers when moisture is detected, wherein said processing system is responsive to at least one remote device to enable or disable automatic control of the windshield wipers, wherein said processing system is coupled to a microwave receiver that receives signals from the at least one remote device, which includes a plurality of satellites, wherein said processing system disables automatic activation of the windshield wipers in response to information from the microwave receiver.

10. The windshield wiper control system of claim 9, wherein the information from the microwave receiver is that microwave receiver is receiving signals from less than two satellites.

11. The windshield wiper control system of claim 10, wherein satellites are part of a global positioning system constellation and the microwave receiver is a GPS receiver.

12. A windshield wiper control system for a vehicle comprising:
   a sensor;
   an optical system operative to direct light rays from at least a portion of the surface of the windshield onto said sensor; and
   a processing system in communication with said sensor and operative to analyze data from said sensor to detect moisture on the windshield and to automatically activate the windshield wipers when moisture is detected, wherein said processing system is responsive to at least one remote device to enable or disable automatic control of the windshield wipers, wherein said processing system disables manual activation of wipers.

13. A system for detecting moisture on a surface comprising:
   an image sensor array including a plurality of light sensors;
   an optical system operative to image at least a portion of the surface onto said image sensor array;
   a supplemental illuminator for selectively illuminating substantially all of said portion of the surface imaged onto said image sensor array;
   memory for storing a first image obtained by said image sensor array when the supplemental illuminator is illuminating said portion of the surface, and for storing a second image obtained by said image sensor array when the supplemental illuminator is not illuminating said portion of the surface; and
   a processing system in communication with said memory, said supplemental illuminator, and said image sensor array and operative to compare the first and second images stored in said memory and to analyze results of the comparison to detect moisture on the surface.

14. The system of claim 13, wherein said light sensors are CMOS sensors.

* * * * *